United States Patent

[11] 3,594,781

[72] Inventor Heinz Gerjets
Wilhelmshaven, Germany
[21] Appl. No. 786,138
[22] Filed Dec. 23, 1968
[45] Patented July 20, 1971
[73] Assignee Olympia Werke AG
Wilhelmshaven, Germany
[32] Priority Dec. 28, 1967
[33] Germany
[31] P 15 37 289.1

[54] ENCODING AND DECODING ARRANGEMENT
14 Claims, 1 Drawing Fig.

[52] U.S. Cl. .......... 340/347 DD
[51] Int. Cl. .......... H03k 13/243
[50] Field of Search .......... 340/347; 235/154; 255/155

[56] References Cited

UNITED STATES PATENTS 2,959,775 11/1960 Marcus .......... 235/155 X
3,201,783 8/1965 Fendeh .......... 340/347
3,400,389 9/1968 Heymann .......... 340/347
3,505,510 4/1970 Harris .......... 340/347 X

OTHER REFERENCES

Klein, " A Simplified Method for the Design of Logical Conversion Matrices," ELECTRONIC ENGINEERING, June, 1955, pp. 270— 272.

*Primary Examiner*—Maynard R. Wilbur
*Assistant Examiner*—Gary R. Edwards
*Attorney*—Michael S. Striker

ABSTRACT: A single diode matrix is used both for decoding encoded information and encoding uncoded information. The column lines of the matrix are connected to receive coded signals, and are further connected on the same side to furnish coded output signals. The rows of the matrix are connected on one side to receive uncoded input signals and, on the same side to furnish uncoded output signals. The other end of the column line is connected to a zero voltage source which is set in response to any incoming uncoded signal. The other end of the row conductors is connected to a 22 volt operating voltage which is set in response to receipt of any coded input signal. The signal for furnishing the 0 and 22 volt operating levels are derived from a second and first OR gate respectively. The output of these OR gates are also connected to a third OR gate, whose output thus furnishes timing signals.

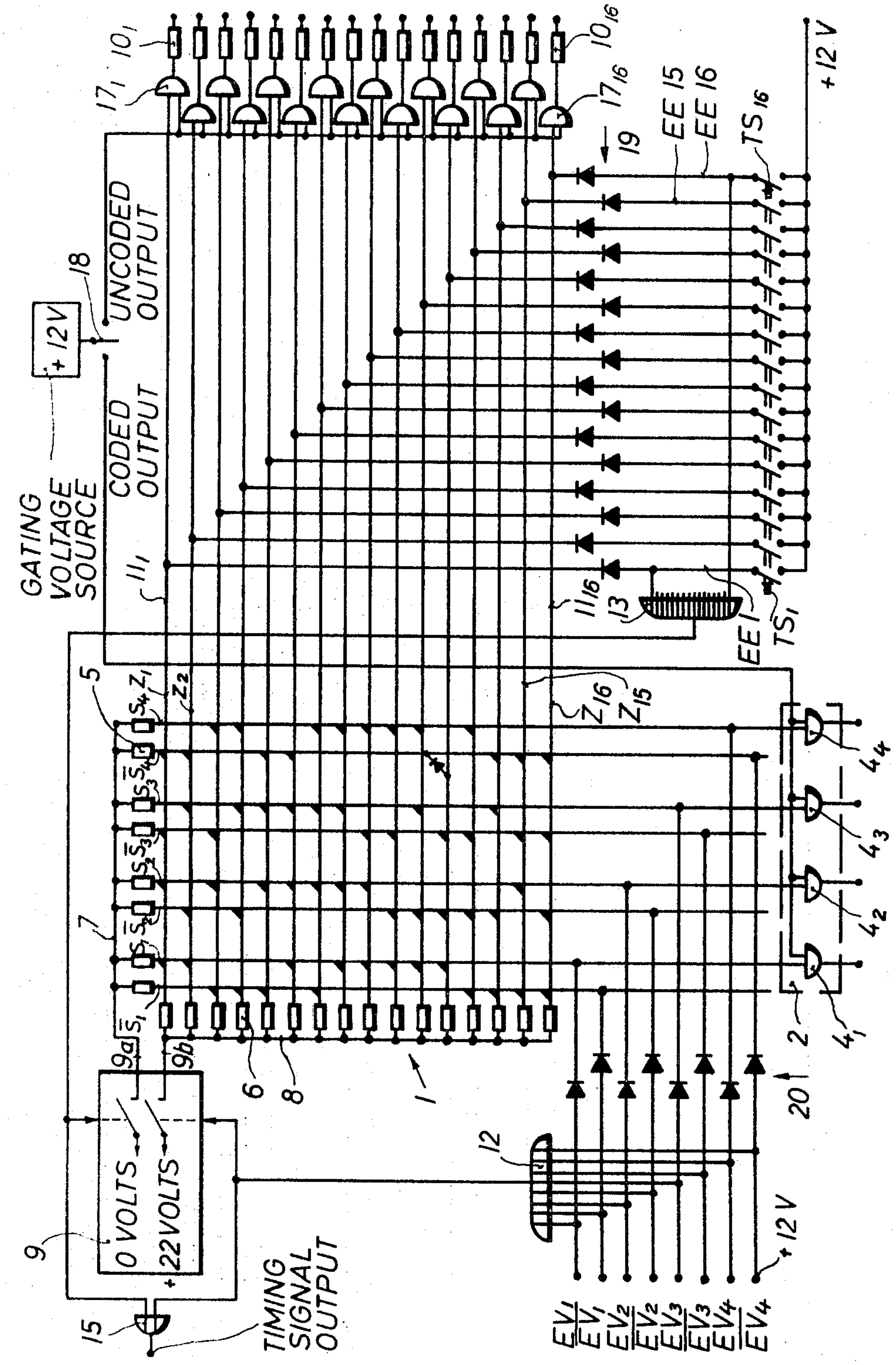
HEINZ GERJETS
INVENTOR
BY: Michael S. Striker
ATTORNEY

ENCODING AND DECODING ARRANGEMENT

BACKGROUND OF THE INVENTION

This invention relates to a circuit arrangement for encoding and decoding signals. In particular, it relates to encoding and decoding circuit arrangements wherein a diode matrix is used. For example, the column lines of the diode matrix may carry the coded signals and the complements thereof.

Coding and decoding arrangements, for taking uncoded signals and converting them to a predetermined code and for taking signals in said predetermined code and decoding them, are often used in data processing installations.

Normally separate circuits are used for coding and decoding. For example a decoding circuit may comprise a plurality of conjunctions, whose output, for example, may be 1, when a determined LO combination appears at a determined number of inputs.

These conjunctions are normally joined together in a matrix whose column lines may for example carry the implement and complement values of the coded signals and whose row conductors each furnish a signal in decoded form.

Similar matrices, which however comprise disjunctions, serve to change signals representing uncoded data into the implement and complement values of coded data.

SUMMARY OF THE INVENTION

It is the object of the present invention to disclose a simple circuit arrangement which may be operated either to encode a large number of different uncoded signals, or, alternatively to decode a wide variety of coded signals, This invention constitutes an arrangement for furnishing coded output signals in response to uncoded input signals and decoded output signals in response to coded input signals. It comprises means for furnishing a first operating level signal. It further comprises means for furnishing a second operating level signal in response to said coded input signals. Further comprised are a plurality of first output means for furnishing said coded output signals and a plurality of second output means for furnishing said uncoded output signals. Coded input signals are furnished by a plurality of first input means, corresponding in number to said plurality of first output means, while uncoded input signals are furnished by a plurality of second input means, corresponding in number to said plurality of second output means. A plurality of first conducting means, corresponding in number to said plurality of second output means are each connected on one side to one of said plurality of second output means and a corresponding one of said plurality of second input means, while they are connected on the other side to said means for furnishing a second operating level signal. A plurality of second conducting means, corresponding in number to said plurality of first input means, are each connected on one side to one of said plurality of first input means and a corresponding one of said plurality of first output means, and all are jointly connected on the other side to said means for furnishing a first operating level signal. Unidirectional conducting means interconnects said plurality of first conducting means and said plurality of second conducting means in such a manner that receipt of an uncoded input signal causes energization of those of said plurality of first conducting means connected to selected ones of said first output means whose energization signifies the coded output signal corresponding to said uncoded input signal. Receipt of a coded input signal then causes energization of the selected one of said second output means which signifies the uncoded signal corresponding to said coded input signal. Thus the signal matrix comprising said first and second conducting means serves both to decode encoded signals and to encode uncoded signals. This operation is made possible by the application of the second operating level signal to the first conducting means or the row conductors upon receipt of coded input signals. This operating level signal may for example be +22 volts. Upon receipt of an uncoded input signal the first operating level signal of, for example 0 volts, may be applied to the column conductors of the matrix. Use of such a single matrix for both encoding and decoding thus, of course, results in a substantial saving in diodes.

The switching from the encoding to the decoding function of the matrix may be accomplished automatically by feeding all incoming coded signals to a first OR gate whose output results in the setting of the second operating level signal, and applying all incoming uncoded signals to a second OR gate whose output may set the operating voltage level on the column conductors.

When operation in synchronism with the input signals is desired, a timing signal may also be derived from this circuit by feeding the outputs of the first and second OR gates into a third OR gate whose output then furnished timing signals.

The circuit of this invention also yields a simple arrangement for controlling the flow of signals or information. It is for example possible that coded signals may be transmitted directly to the output means for furnishing coded signals. Thus, for example, it is possible that coded input signals, derived for example from a punched or a magnetic tape may be directly furnished to a perforator. For this purpose the column conductors of the combined coding and decoding matrix may, for example, be used.

It is further possible that uncoded input signals are furnished in coded form at the output for furnishing coded signals or, alternatively, that these uncoded input signals are transmitted directly to the output means for furnishing uncoded signals.

In order to permit this selection of coded or uncoded output signals in response to either coded or uncoded input signals, both the first output means for furnishing coded signals and the second output means for furnishing uncoded output signals each comprise a plurality of AND gates. Each AND gate associated with the first output means has one input connected to a common line with the corresponding input of all other AND gates associated with said first output means. The common line is connected to a switch which may be activated to furnish a gating voltage to all of these gates simultaneously. In the presence of this gating voltage the gates are conductive and coded output signals are furnished upon receipt of either coded or uncoded input signals. Each of the AND gates associated with the second output means also has one input connected to a common line. A gating voltage applied to this common line permits signals to pass through these second output AND gates, thus permitting the furnishing of uncoded output signals in response to either coded or uncoded input signals. Since it is not desired that both coded and uncoded output signals be furnished simultaneously, a switch is provided to permit application of the gating voltage only to the AND gate associated with the first output means or, alternatively, to the AND gates associated with the second output means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic circuit diagram of a coding and decoding arrangement in accordance with this invention.

DESCRIPTION OF THE PREFERRED EMBODIMENT

In the FIGURE, the reference numeral 1 denotes a diode matrix, comprising first conducting means (row conductors) denoted $Z_1$ to $Z_{16}$ and second conducting means (column conductors) denoted $S_1$, $\overline{S_1}$ to $S_4$, $\overline{S_4}$. Each column line is connected via decoupling means 20 to a corresponding input line $EV_1$, $\overline{EV_1}$ through $EV_4$, $\overline{EV_4}$ respectively. Each column conductor is connected via a bias means, here the resistors marked 5, to a common line 7 which is connected to the means for furnishing a first operating level signal (0 volts), here illustrated as the output 9a of a voltage selector switch 9.

The other ends of the column conductors $S_1$ through $S_4$ (those column conductors carrying the implement values of the coded signal) are each connected to the input of a corresponding AND gate $4_1$ through $4_4$, which constitute the first output means. The outputs of these AND gates could for example, be used to activate a perforator.

The row conductors $Z_1$ to $Z_{16}$ of the diode matrix 1 are connected on the one hand to a common line 8 via bias means, here the resistors 6. The common line 8 is connected to a means for furnishing a second operating level signal (+22 volts), here the output 9b of the above-mentioned switch 9.

As can be seen in the center of the FIGURE, the row conductors $Z_1$ to $Z_{16}$ terminate in uncoded signal lines $11_1$ to $11_{16}$ which, in turn, terminate in the second output means, or means for furnishing uncoded signals. Comprised in the second output means are AND gates $17_1$ to $17_{16}$. One input of each of these AND gates $17_1$ to $17_{16}$ is connected to a common line and through this common line to one terminal of a switch 18. The switch 18 permits application of a gating voltage (+12 volts) to the AND gates $17_1$ through $17_{16}$ when uncoded output signals are desired. The second output terminal of the switch 18 is connected to a common line joining one input each of the AND gates associated with the first output means. This switch 18 may for example be a flip-flop which alternatively blocks or gates the AND gates $4_1$ to $4_4$ and $17_1$ to $17_{16}$, respectively.

Each of the lines $11_1$ through $11_{16}$ is connected to a corresponding input line $EE_1$ to $EE_{16}$ connected to a corresponding switch $TS_1$ to $TS_{16}$ via a decoupling means 19. Switches $TS_1$ through $TS_{16}$ form input means for furnishing uncoded input signals. In the example shown, activation of one of the switches $TS_1$ to $TS_{16}$ results in the application of an input voltage of +12 volts to the corresponding row conductor $Z_1$ to $Z_{16}$. It should be noted that this voltage of +12 volts is the same voltage as is applied to the column conductor in the presence of coded signals. The absolute level of this input voltage is not critical. However, the input voltage applied to the row conductors in the presence of an uncoded signal should be substantially the same as the input voltage applied to the column conductors in the presence of coded signals.

The input lines $EV_1$ to $\overline{EV_4}$ upon which the coded signals are furnished are connected to a first OR gate, numbered 12 in the FIGURE, whose output is connected to the input of switch 9 which causes the operating level of +22 volts to be applied to the row conductors of the matrix. Similarly the second input of switch 9 is connected to a second OR gate 13 whose input is the uncoded input signals. Thus upon input of coded signals the OR gate 12 yields an output signal resulting in an operating level of +22 volts being applied to the row conductors, while input of an uncoded signal causes activation of the second OR gate 13 and the setting of a 0 reference level operating level for the column conductors. The matrix thus operates as a decoder or a coder respectively. Of course the operating level may be furnished in other ways, for example by activation of keys on a keyboard, without changing the basic idea of this invention.

A third OR gate, 15, is connected to the set inputs of the voltage selector switch for furnishing timing signals. These timing signals always appear when either a coded or an uncoded input signal is applied to the circuit arrangement of this invention.

It can be seen from the FIGURE that input of coded signals causes the diode matrix 1 to act as a decoder. The diode matrix then selects one of the row conductors $Z_1$ to $Z_{16}$ which then carries the decoded signal. If the switch 18 is in the correct position the signal of this energized line is then applied via the corresponding AND gate 17 to the corresponding one of the second output means 10 for furnishing decoded signals. The output means 10 may for example comprise electromagnets which initiate certain functions in computers after amplification by an interposed amplifier.

The implement values of the coded signals of course also appear at the input of the AND gates $4_1$ to $4_4$, so that for the appropriate position of switch 18 the coded signals are available at the output of said AND gate and may then be used to activate a perforator.

As an example let it be assumed that switch $TS_1$ is closed. This results in a signal appearing at the output of OR gate 13, causing a 0 volt operating level to appear on common line 7 to which the column wires are connected. The +12 volts from $EE_1$ are then transmitted through means 19 to line $11_1$ and row conductor $Z_1$. Because of the diode interconnection between the column conductors and the row conductors the +12 volts on row conductor $Z_1$ cause column conductors $S_1$, $S_2$, $\overline{S_3}$, and $\overline{S_4}$ to become energized to substantially +12 volts. Thus, if switch 18 is connected over to the left-hand position in the FIGURE, a signal will appear at the outputs of AND gates $4_1$ and $4_2$, while no signal will appear at the outputs of AND gates $4_3$ and $4_4$. Thus the coded output signal corresponding to an uncoded input signal on line $Z_1$ corresponds to $S_1$, $S_2$, $\overline{S_3}$ and $\overline{S_4}$. If now a coded input signal comprising $EV_1$, $EV_2$, $\overline{EV_3}$ and $\overline{EV_4}$ is received the first OR gate will have an output setting the second operating level signal to +22 volts. It will then become obvious that only a row conductor connected by diodes to column conductors all of which are energized will maintain a voltage level of +12 volts. Examination of the FIGURE shows that for a coded signal $EV_1$, $EV_2$, $\overline{EV_3}$ and $\overline{EV_4}$ this row conductor will be conductor $Z_1$. Thus it is shown that the coded output signal resulting from a coding of an uncoded input signal is the same as the coded input signal required for energizing the same uncoded signal.

For positive (+12 volts) input signals, the actuating potential at 8 is +22 volts for decoding operation, and at 7 is 0 volts for coding operation. The diode polarity is as shown in the drawing. However, with negative (−12 volts) input signals, the diodes of matrix 1 must be reversed, and the corresponding actuating potential at 8 must be −22 volts. The diodes of the decoupling means 19 and 20 must also be reversed.

The switches $TS_1$ to $TS_{16}$ may of course be keys.

The circuit arrangement according to this invention may in practice have an arbitrary number of signal input lines and signal output lines and the diode matrix 1 may then be proportioned to be of corresponding size. Thus the arrangement may be used for converting an arbitrary number of uncoded signal inputs into any arbitrary code, subject only to the restriction that the number of individual signals comprised in a coded signal is equal to or less than the number of uncoded signal output or input lines.

What I claim as new and desire to be protected by Letters Patent is set forth in the appended claims.

1. Arrangement for furnishing coded output signals in response to uncoded input signals, and decoded output signals in response to coded input signals, comprising, in combination, means for furnishing a first operating level signal; means for furnishing a second operating level signal when coded signals are to be decoded; a plurality of first output means for furnishing said coded output signals; a plurality of second output means for furnishing said uncoded output signals; a plurality of first input means, corresponding in number to said plurality of first output means, for furnishing said coded input signals; a plurality of second input means, corresponding in number to said plurality of second output means, for furnishing said uncoded input signals; a plurality of first conducting means corresponding in number to said plurality of second output means, each connected on one side to one of said plurality of second output means and a corresponding one of said plurality of second input means, and on the other side to said means for furnishing a second operating level signal; a plurality of second conducting means, corresponding in number to said plurality of first input means, each connected on one side to one of said plurality of first input means and a corresponding one of said plurality of first output means, all jointly connected on the other side to said means for furnishing a first operating level signal; and unidirectional conducting means connected between said plurality of first conducting means and said plurality of second conducting means in such a manner that receipt of an uncoded input signal causes energization of those of said plurality of first conducting means connected to selected ones of said first output means whose energization signifies the coded output signal corresponding to said uncoded input signal, and receipt of a coded input signal causes energization of the selected one of said second output means which signifies the uncoded signal corresponding to said coded input signal, whereby a single matrix comprising said first and second conducting means serves both to decode encoded signals and encode uncoded signals.

2. An arrangement as set forth in claim 1 wherein said means for furnishing a second operating level signal comprises means for furnishing a second operating level signal in response to said coded input signals.

3. An arrangement as set forth in claim 1, also comprising a plurality of signal attenuating means, one connected between each of said plurality of first conducting means and said means for furnishing a second operating level signal; and a plurality of additional signal attenuating means each connected between one of said second conducting means and said means for furnishing a first operating level signal.

4. An arrangement as set forth in claim 1, wherein said unidirectional conducting means comprise diodes; and wherein said diodes and said first and second conducting means jointly constitute a single diode matrix.

5. An arrangement as set forth in claim 1 wherein said means for furnishing a first operating level signal and said means for furnishing a second operating level signal comprise means for furnishing a first operating voltage level and means for furnishing a second operating voltage level, respectively.

6. An arrangement as set forth in claim 3 wherein each of said coded input signals comprises a plurality of individual binary signals and the complements thereof; and wherein said means for furnishing said first input signals comprises a plurality of first input lines, each of said input lines furnishing a binary signal or the complement thereof; and means for applying a first input voltage to selected lines representing a coded input signal.

7. An arrangement as set forth in claim 4 wherein said second input means comprise a plurality of second input lines; and means for applying a second input voltage to a selected one of said second input lines, said selected line representing said uncoded input signal.

8. An arrangement as set forth in claim 5 wherein said first input voltage and said second input voltage are substantially equal.

9. An arrangement as set forth in claim 1 further comprising means for generating a timing signal in response to any one of said input signals.

10. An arrangement as set forth in claim 7 wherein said means for generating a timing signal comprise a first OR gate having a plurality of first OR gate inputs, one connected to each of said first input means, and a first OR gate output; a second OR gate having a plurality of second OR gate inputs, one connected to each of said second input means, and a second OR gate output; and a third OR gate having a first input connected to said first OR gate output and a second input connected to said second OR gate output, and an output for furnishing said timing signals.

11. An arrangement as set forth in claim 1 wherein said first output means comprise a plurality of first output AND gates, each having a first and second AND gate input, and an AND gate output, each of said first AND gate inputs being connected to a selected one of said second conducting means; and means for applying a gating voltage to all of said second AND gate inputs when coded output signals are desired, said AND gate output signals thus constituting said coded output signals.

12. An arrangement as set forth in claim 1 wherein said plurality of second output means comprise a plurality of second output AND gates, each of said second output AND gates having a first input and a second input, and an AND gate output; wherein said first AND gate inputs are each connected to one of said first conducting means; and means for applying a gating signal to each of said second AND gate inputs when uncoded output signals are desired, whereby said second output AND gate output signals constitute said uncoded output signals.

13. An arrangement as set forth in claim 10 wherein said means for applying a gating voltage to said first output AND gates and said means for applying a gating voltage to said second output AND gates comprise means for alternatively applying a gating voltage to said first or second output AND gates.

14. Arrangement for furnishing coded output signals in response to uncoded input signals, or decoded output signals in response to coded input signals, comprising, in combination, a diode matrix having a plurality of first conducting means for carrying uncoded or decoded signals, and a plurality of second conducting means for carrying coded signals as well as their complementary values; a plurality of diodes interconnected said first and second conducting means in accordance with the desired code combinations; a plurality of first input lines receiving uncoded input signals; first decoupling means connecting said first conducting means to said first input lines; a plurality of second input lines receiving coded input signals; second decoupling means connecting said second conducting means to said second input lines; means for supplying a first bias potential to said second conducting means for the coding operation and supplying a second bias potential to said first conducting means for the decoding operation; first OR gate means having inputs coupled to said second input lines, second OR gate means having inputs coupled to said first input lines, the output of said first OR gate means being connected for supplying said second bias potential upon occurrence of an input signal at a second input line, the output of said second OR gate means being connected to actuate the first bias potential upon occurrence of an input signal at one of said first input lines.